F. B. COCKBURN.
HEAD STOCK FOR ENGINE LATHES.
APPLICATION FILED APR. 16, 1917.

1,259,959.

Patented Mar. 19, 1918.
3 SHEETS—SHEET 1.

Inventor
Francis B. Cockburn

Wood & Wood
Attorneys

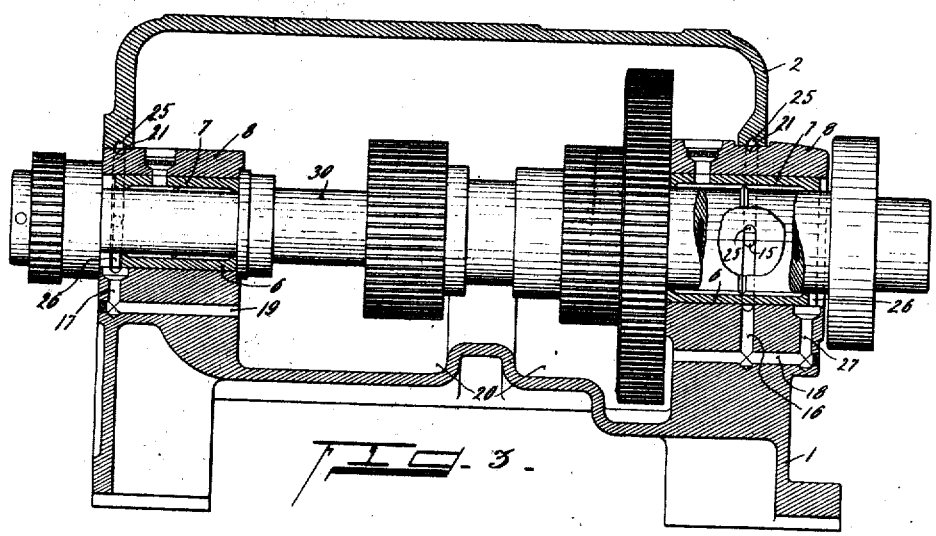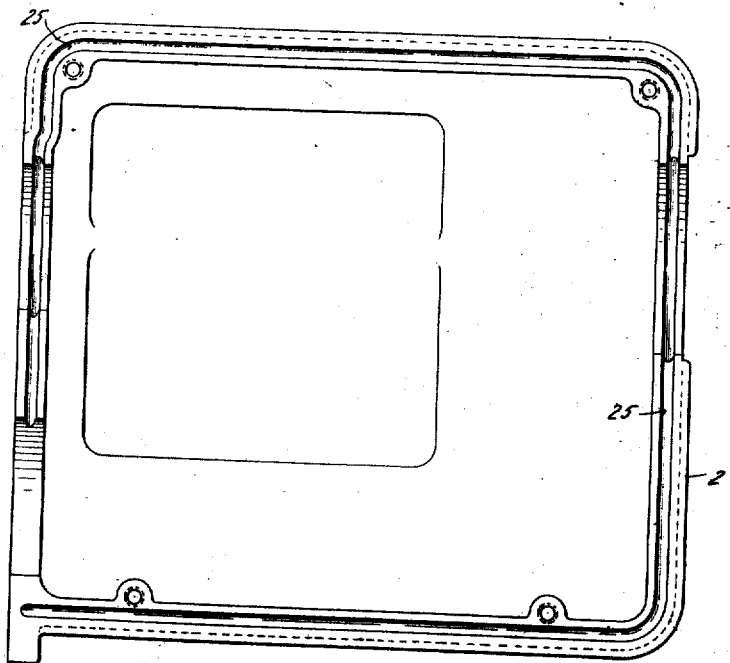

F. B. COCKBURN.
HEAD STOCK FOR ENGINE LATHES.
APPLICATION FILED APR. 16, 1917.
1,259,959.
Patented Mar. 19, 1918.
3 SHEETS—SHEET 3.
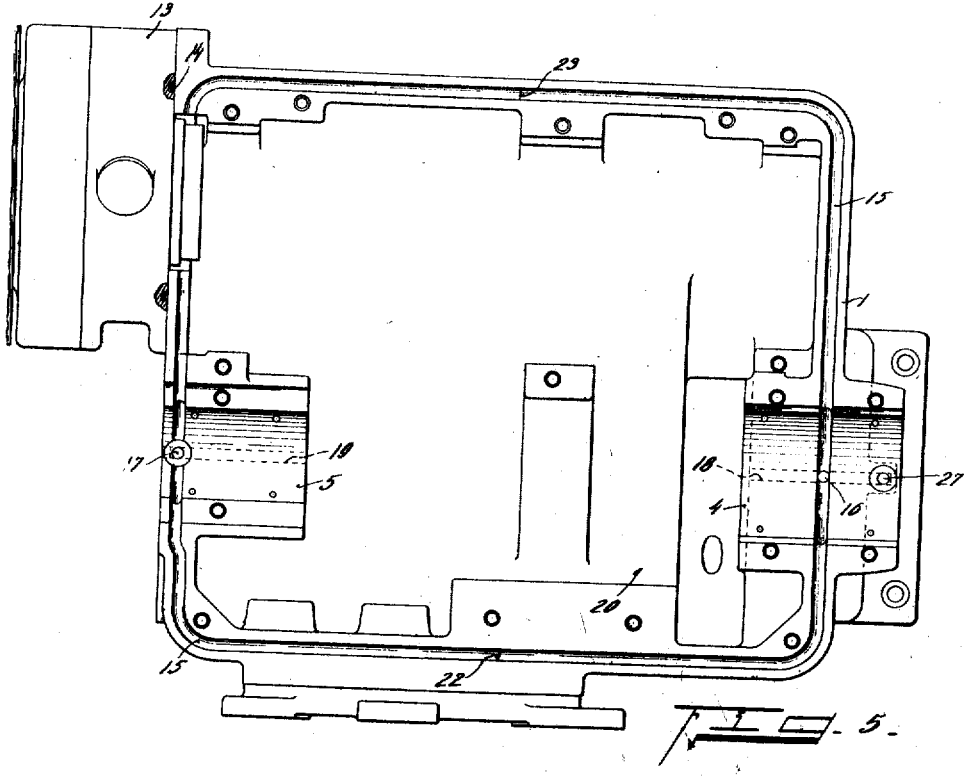
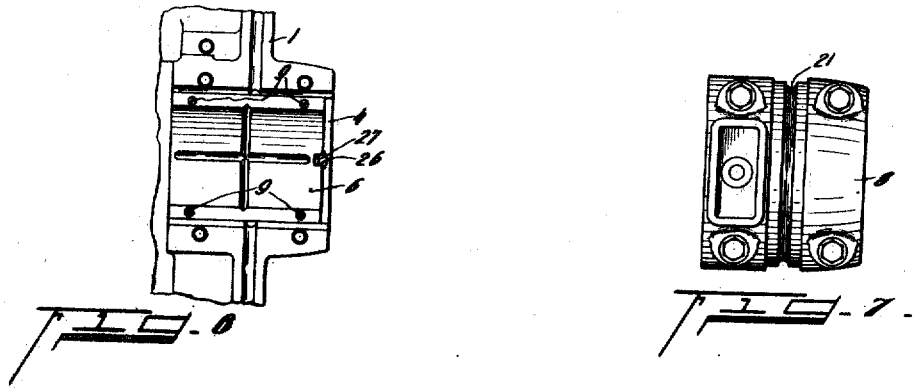

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

HEAD-STOCK FOR ENGINE-LATHES.

1,259,959.   Specification of Letters Patent.   Patented Mar. 19, 1918.

Application filed April 16, 1917. Serial No. 162,475.

*To all whom it may concern:*

Be it known that I, FRANCIS B. COCKBURN, a subject of the King of Great Britain, and residing at Cincinnati, in the county of Hamilton and State of Ohio, have invented a new and useful Improvement in Head-Stocks for Engine-Lathes, of which the following specification is a full disclosure.

My invention relates to an improvement in a head-stock for engine lathes, particularly designed for the geared head type of spindle drive.

An object of the invention is to provide a head-stock structure having provisions for insuring efficient spindle lubrication and which will internally confine the oil to prevent its leaking outwardly through the head-stock joints or outwardly around the spindle bearings.

To this end the invention provides a two-part head-stock casing between which the spindle bearings are placed, the meeting surfaces of these casing members being formed with registering oil channels extending horizontally around the inclosed spindle and suitably graded to constitute an oil drain into the oil pit formed by the floor of the lower casing member.

Also, the members forming the two end bearings for the spindle are formed with circumferential registering oil drains communicating with the horizontal oil channel, and having drain ducts into the oil pit. These spindle bearing members are formed to wipe the oil traveling outwardly longitudinally along the spindle and to drain this oil into the drain ducts leading to the oil pit.

I thus provide a communicating and graded oil channel system extending horizontally entirely around the spindle in the head-stock walls and reaching around the bearings within the head-stock, which forms a continuous lubricating stream from a given supply source, and which system drains into a common oil pit or well and prevents the outward escape of oil around the head-stock spindle and spindle bearing joints.

This constitutes an entirely inclosed head-stock structure with adequate lubrication provisions and yet entirely oil tight.

Fig. 3 is a vertical longitudinal section on line 3—3, Fig. 1.

Fig. 4 is a bottom plan view of the upper casing member.

Fig. 5 is a top plan view of the lower casing member with the head-stock mechanism and the spindle bearing caps and sleeves removed.

Fig. 6 is a detailed plan view of the front spindle bearing of the lower casing member showing the lower half of the spindle bearing sleeve.

Fig. 7 is a plan view of the front bearing cap.

Figure 1:
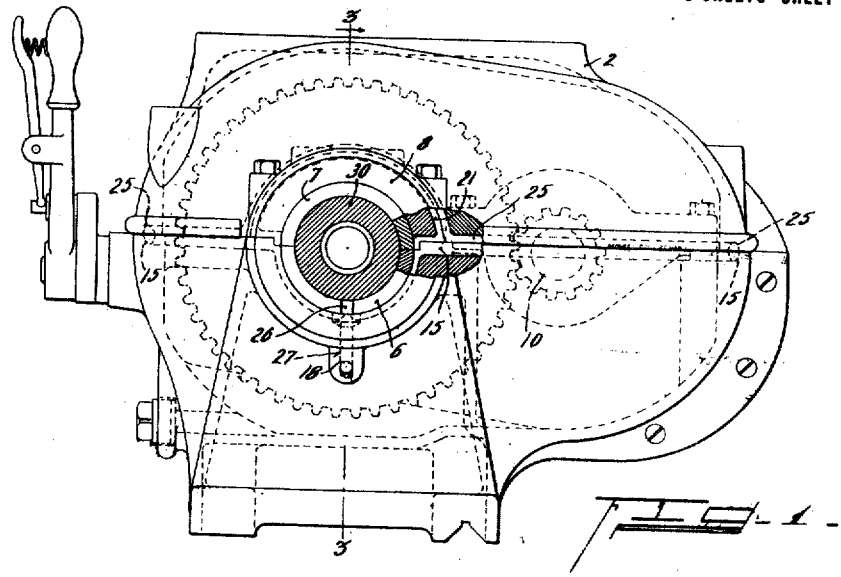
Figure 1 is a front end elevation, partly broken, to more clearly show the arrangement of the spindle bearing oil channel.
Figure 2:
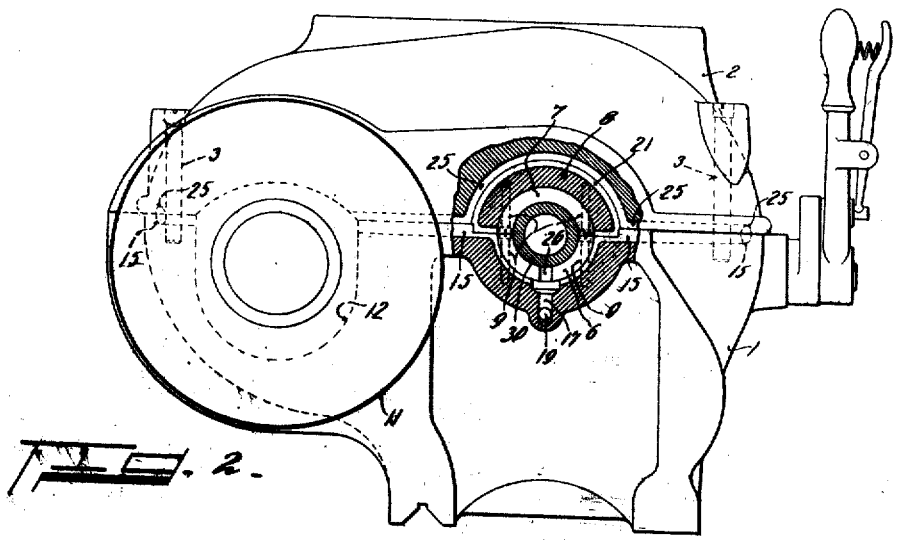
Fig. 2 is a rear end elevation similarly broken.

The two-part head-stock casing illustrated in the drawings comprises a lower casing member 1 in which the head-stock mechanism is supported and an upper casing member or cover 2 suitably secured thereto by bolts 3, two of which are shown in Fig. 2. 4, 5, represent alined main spindle bearing seats and each bearing comprises a two-part spindle bearing sleeve having lower and upper half members 6, 7, and a bearing cap 8 suitably secured to the lower casing member to retain the spindle 30. These half sleeve members 6, 7, are secured to their respective seats and bearing caps by bolts 9, (see Fig. 2). The drive shaft 10 is coupled with the drive pulley 11 through an aperture 12 in the casing, the pulley being supported by a housing 13 bolted to the rear end of the casing and provided with a gasket 14 insuring an oil tight joint between said casing and housing.

The upper joint surface of the casing member 1 is formed with a horizontal oil channel 15 which extends downwardly at and follows the contour of the bearing seats 4, 5, converging into vertical drain ducts 16, 17, which through horizontal drain ducts 18, 19, communicate with and drain into the oil pit or well 20. The bearing caps 8 are provided with peripheral oil grooves 21 which vertically aline and communicate with the oil channel 15. The channel 15 is shallowest at 22, 23, from which points it is graded toward both spindle bearings to induce a proper flow of the returning oil.

The under joint surface of the upper casing member or cover 2 is contoured at the spindle bearings to closely fit over the bearing cap members 8 and is provided with an oil channel 25 which, when said member is secured to the lower casing member, registers with the oil channel 15 thereof to form an extended oil drain passage serving to arrest any oil which may commence to escape through the casing joint and return it to the oil pit or well 20.

To prevent oil from flowing outwardly along the spindle past the casing, provision is made for wiping the oil from the spindle and entraining it to the oil drain system.

As seen in Fig. 3, the two-part spindle bearing sleeve is somewhat shorter than the bearing seats 4, 5, and bearing caps 8, and that each lower half 6 of said sleeve is notched as at 26 immediately above and adjacent an appropriate drain duct of the oil drain system. At the front bearing seat 4 said notch drains into a vertical duct 27, having an enlarged upper end and which communicates with the horizontal duct 18. At the rear bearing seat said notch is directly alined with the above mentioned vertical duct 17 which also has an enlarged upper end. These notches provide means for wiping the surplus oil from the spindle and entraining it into the oil drain system.

From the above it will be seen that the invention provides a two-part oil tight casing entirely inclosing a geared head-stock mechanism lubricated by a splash oil system, and further that the invention provides a two-part casing having self-draining meeting edges or joints.

Having described my invention I claim:—

1. A head-stock for a lathe comprising a two-part casing, spindle bearings and a spindle journaled therein, the casing comprising a lower and an upper casing member providing a horizontal casing joint extending around the spindle, the meeting surfaces of the casing members having registering oil channels forming a graded oil drain passage extending around the spindle bearings and terminating with oil ducts adjacent and below the spindle bearings and draining into the interior of the casing.

2. A head-stock for a lathe comprising a two-part casing and a spindle journaled therein, the casing comprising a lower and an upper casing member providing a horizontal casing joint extending around the spindle, the lower casing member having alined bearing seats, bearing caps secured to said lower casing member and provided with peripheral oil grooves, two-part bearing sleeves comprising lower half members secured to said bearing seats and upper half members secured to the bearing caps, the joint surface of the lower casing member being provided with an oil channel extending around the bearing seats to terminal drain ducts adjacent and below said seats and draining into the interior of the casing, the joint surface of the upper casing member being formed with an oil channel registering with the oil channel of the lower casing member and with the oil grooves of the bearing caps to form a graded oil drain passage for the casing and bearing joints.

3. A head-stock for a lathe comprising a two-part casing and a spindle journaled therein, the casing comprising a lower and an upper casing member providing a horizontal casing joint extending around the spindle, the lower casing member having alined bearing seats, bearing caps secured to said lower casing member and provided with peripheral oil grooves, and two-part bearing sleeves comprising lower half members secured to said bearing seats and upper half members secured to the bearing caps, the joint surface of the lower casing member being provided with an oil channel extending around the bearing seats to terminal drain ducts adjacent and below said seats and draining into the interior of the casing, the joint surface of the upper casing member being formed with an oil channel registering with the oil channel of the lower casing member and with the oil grooves of the bearing caps to form a graded oil drain passage for the casing and bearing joints, the lower half member of the spindle bearing sleeves each having a wiper notch in registry with a respective terminal oil drain duct of the lower casing member.

4. A head-stock for a lathe comprising a two-part casing and a spindle journaled therein, the casing comprising a lower and an upper casing member providing a horizontal casing joint extending around the spindle, the lower casing member having alined bearing seats, bearing caps secured to said lower casing member and provided with peripheral oil grooves, the joint surface of the lower casing member being provided with an oil channel extending around the bearing seats to terminal drain ducts adjacent and below said seats and draining into the interior of the casing, the joint surfaces of the upper casing member being formed with an oil channel registering with the oil channel of the lower casing member and with the oil grooves of the bearing caps to form a graded oil drain passage for the casing and bearing joints.

5. A head-stock for a lathe comprising a two-part casing and a spindle journaled therein, the casing comprising a lower and an upper casing member providing a horizontal casing joint extending around the spindle, the lower casing member having alined bearing seats, bearing caps secured to said lower casing member and provided with peripheral oil grooves, the joint surface of the lower casing member being provided with an oil channel extending around the bearing seats to terminal drain ducts adjacent and below said seats and draining into the interior of the casing, the joint surface of the upper casing member being formed with an oil channel registering with the oil channel of the lower casing member and with the oil grooves of the bearing caps to form a graded oil drain passage for the casing and bearing joints, and stationary spindle bearing sleeves having wiper notches in respectice registry with the terminal drain ducts of the lower casing member.

6. A head-stock for a lathe comprising a two-part casing as an inclosure for a splash lubricated head-stock mechanism including a spindle journaled between the casing members, the meeting joint surfaces of the casing members and spindle bearings having registering oil channels to form an oil flow passage having terminal oil draining ducts.

7. A splash lubricated head-stock for a lathe comprising head-stock mechanism and bearings therefor, a sectional casing inclosing said mechanism and bearings, the meeting surfaces of said casing sections being formed to constitute an oil flow conduit surrounding the head-stock mechanism to prevent external breakage, the sectional casing being formed with a duct to drain the oil from said conduit.

In witness whereof, I hereunto subscribe my name, as attested by the two subscribing witnesses.

FRANCIS B. COCKBURN.

Witnesses:
M. SMITH,
L. BECK.